United States Patent [19]

Riecke et al.

[11] 4,221,690

[45] Sep. 9, 1980

[54] COATING COMPOSITION FOR ACCEPTOR SHEETS IN CARBONLESS COPYING

[75] Inventors: Kurt Riecke, Kempen; Ferdinand Land, Viersen, both of Fed. Rep. of Germany

[73] Assignee: Feldmühle Aktiengesellschaft, Düsseldorf-Okerkassel, Fed. Rep. of Germany

[21] Appl. No.: 921,942

[22] Filed: Jul. 5, 1978

[30] Foreign Application Priority Data

Jul. 12, 1977 [DE] Fed. Rep. of Germany ....... 2731418

[51] Int. Cl.[2] .................................................. C08L 9/10

[52] U.S. Cl. .......................... 260/29.7 R; 260/29.6 M; 260/29.6 MM; 427/150; 427/151

[58] Field of Search ................ 260/29.6 M, 29.6 MM, 260/29.7 M; 427/150, 151

[56] References Cited

U.S. PATENT DOCUMENTS

| | | | |
|---|---|---|---|
| 2,760,431 | 8/1956 | Beatty | 260/29.6 M |
| 3,595,822 | 7/1971 | Swank | 260/29.6 MM |
| 3,725,327 | 4/1973 | Stearns | 260/29.6 MM |
| 3,803,074 | 4/1974 | Jenkins | 260/29.7 M |
| 3,838,047 | 9/1974 | Le Blanc | 260/29.6 M |
| 4,022,735 | 5/1977 | Thompson | 260/29.7 M |
| 4,038,101 | 7/1977 | Thompson | 427/150 |
| 4,109,048 | 8/1978 | Dessauer | 428/325 |

*Primary Examiner*—Paul R. Michl

*Attorney, Agent, or Firm*—Toren, McGeady and Stanger

[57] ABSTRACT

Acceptor sheets for carbonless copying are prepared by coating a suitable substrate with an aqueous composition which, in addition to known dispersed acceptor materials, such as acid treated clays, contains at least one basic zinc salt substantially insoluble in water in an amount, as ZnO, of 2 to 50% by weight of the acceptor pigments on a dry basis, the composition having a pH below 7.

9 Claims, 4 Drawing Figures

COATING COMPOSITION FOR ACCEPTOR SHEETS IN CARBONLESS COPYING

Figure 1:
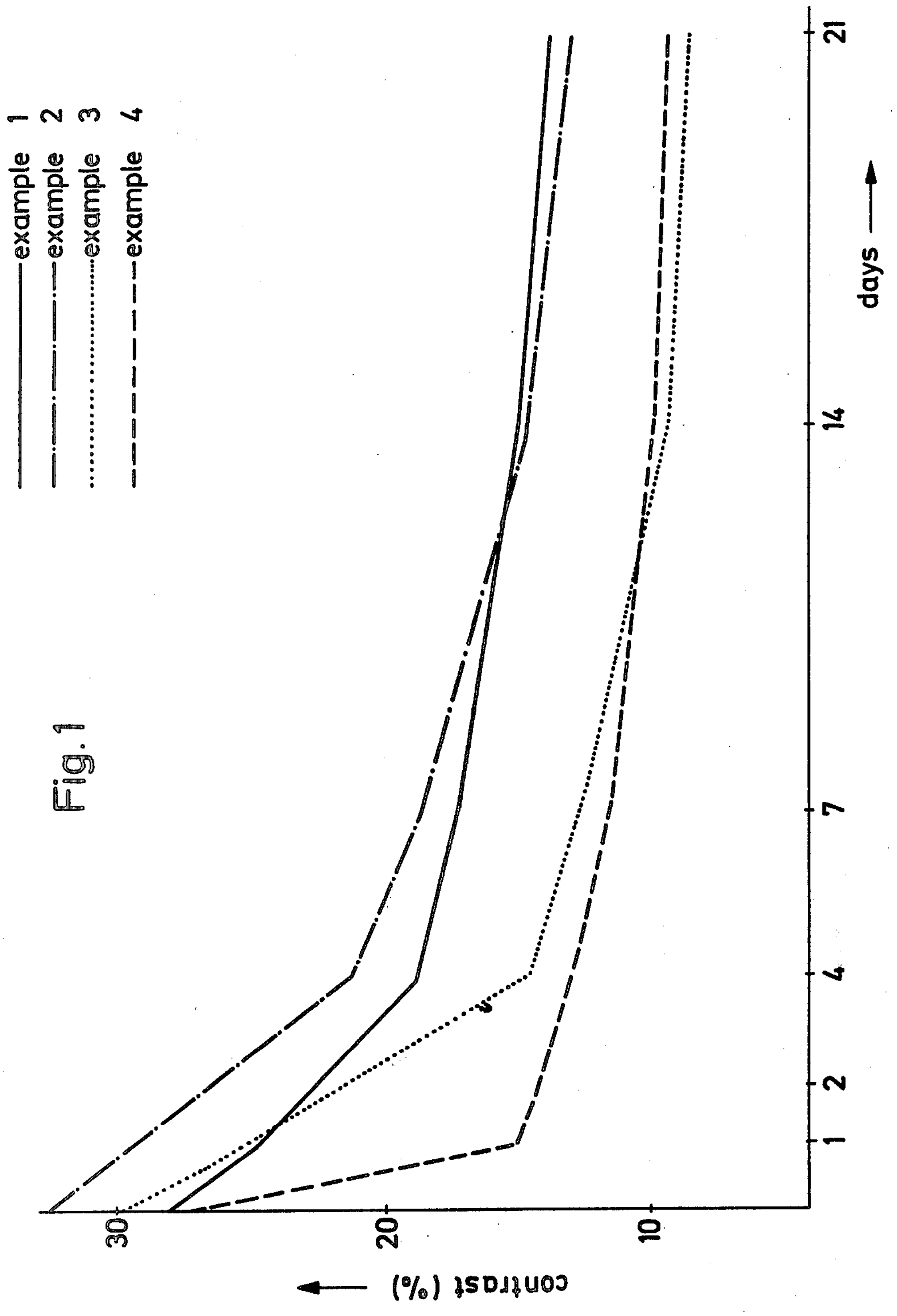

This invention relates to carbonless copying, and particularly to coated acceptor sheets which, upon contact with certain dye precursors, develop colored images. In its more specific aspects, this invention is concerned with coating compositions for coating paper and other substrates in the manufacture of acceptor sheets, and the preparation of end compositions.

It is known from the commonly owned application Ser. No. 760,274, filed Jan. 18, 1977, that zinc salts improve the characteristics of an acceptor sheet containing other reactive pigments as acceptor materials, but zinc salts as such are not compatible with latex binders, preferred in coating compositions for acceptor sheets. It was found in the earlier invention that compatibility with latex binders could be improved if the zinc salts were present in the coating composition as zinc-amine complexes. The large amounts of ammonia driven off from such coating compositions during drying require elaborate ventilating equipment for maintaining an acceptable atmosphere in the working area near the coating equipment.

It is a primary object of this invention to provide a coating composition which retains or exceeds the known beneficial effects of zinc on acceptor paper, but permits the use of latex binders, and does not produce noxious fumes during processing.

Insoluble or practically insoluble basic zinc salts dispersed in the aqueous coating composition have been found to be as good or better in their effects on the characteristics of the acceptor paper than the known zinc amine compounds, and not to release ammonia during drying of the coating since the pH of the coating may be held below 7, preferably between 6 and 7.

Many water soluble zinc salts can be converted to the desired insoluble or practically insoluble salts by reaction with carefully metered amounts of sodium hydroxide or like alkalinizing agent insufficient for converting the salt to the hydroxide or oxide. The chloride, bromide, iodide, sulfate, acetate, and nitrate of zinc are merely typical of the zinc salts useful in the coating compositions of this invention when partly reacted with strong bases. In the absence of any advantages in the use of the other salts, the readily available and inexpensive zinc chloride is the preferred zinc salt.

It has been found that the amount of alkalinizing agent reacted with the zinc chloride should be chosen to convert as much as possible, at least 50% or more, of the zinc values available to the insoluble, basic zinc chloride of the formula $ZnCl_2[Zn(OH_2]_4$. This compound, when dispersed in water, does not release a significant amount of zinc ions that could affect the rheological properties of the coating composition, yet imparts to the coated acceptor sheets all the desired benefits. Generally, the maximum proportion of the desired basic zinc chloride is obtained by adding to a solution of zinc chloride about 80% of the stoichiometrically equivalent amount of the sodium or potassium hydroxide that would convert all zinc chloride to zinc oxide or hydroxide.

The basic zinc compounds have been found to be most effective in improving the coated acceptor sheet when they are deposited in the form of small particles on the larger particles of acid treated clay or other material which forms the bulk of the acceptor pigments in the coating composition. This distribution of the basic zinc compounds is conveniently achieved by dissolving the zinc chloride in a slurry of the reactive clays and other mineral matter, and by adding the alkalinizing agent to the solution in a manner to prevent localized reactions. Strong agitation of the mixture during addition of the alkalinizing agent is helpful in this respect, and particularly good results are achieved by spraying a sodium hydroxide solution into the agitated, zinc-ion bearing slurry.

Conversion of zinc chloride to zinc oxide or zinc hydroxide is to be avoided or held to a minimum because these compounds are far inferior to the basic zinc salts in their ability of enhancing the effects of other acceptor materials.

Sodium or potassium hydroxide may be replaced in part by water-soluble alkali metal salts of resin acids, such as abietic acid, or the adducts of colophonium modified by acrylic acid, maleic acid, and the esters of these unsaturated acids.

The preferred acceptor pigments employed in conjunction with the basic zinc salts of the invention are those which have a large active surface such as montmorillonite clay containing a small amount of trivalent iron in its lattice, also the mixture of $\gamma$-alumina and its precursors described in great detail in the afore-mentioned copending application. Boehmite and other hydrated forms of aluminum oxide are converted practically entirely to $\gamma$-alumina, when heated from 300° to 1000° C. whereas other hydrated aluminas are converted to the $\alpha$-form. For reasons still not entirely understood, a mixture of $\gamma$-alumina and its precursors capable of being converted to $\gamma$-alumina by heating and by the voltailization of 1 to 30% water are superior both to other hydrated forms of alumina and to pure $\gamma$-alumina in their color reactions with the afore-mentioned and other leukodyes.

Montmorillonite clays, referred to hereinafter as montmorillonite for the sake of brevity, and the afore-described mixture of $\gamma$-alumina and its precursors impart different characteristics to acceptor papers, as will be illustrated by specific Examples, and the properties of an acceptor sheet may be controlled to some extent by combining the clay and the $\gamma$-alumina mixture over a wide range of ratios. As little as 10% of either component combined with 90% of the other component has a significant effect on the results achieved.

The trivalent iron present in the preferred grades of montmorillonite type clay enhances the color forming reaction with oxidation sensitive leuko-dyes such as benzoylleukomethylene blue. When much of the clay is replaced by the $\gamma$-alumina mixture, it is advantageous to supply cupric compounds or other oxidation catalysts. When the reactive components in a coating composition of the invention consist of 30–50% $\gamma$-aluminum oxide and its precursors, 70–50% reactive clay, 2–12% basic zinc compound, calculated as ZnO, and 0.1–2% copper compounds, calculated as CuO, the coating is effective with a wide range of commercially available donor sheets.

Figure 2:
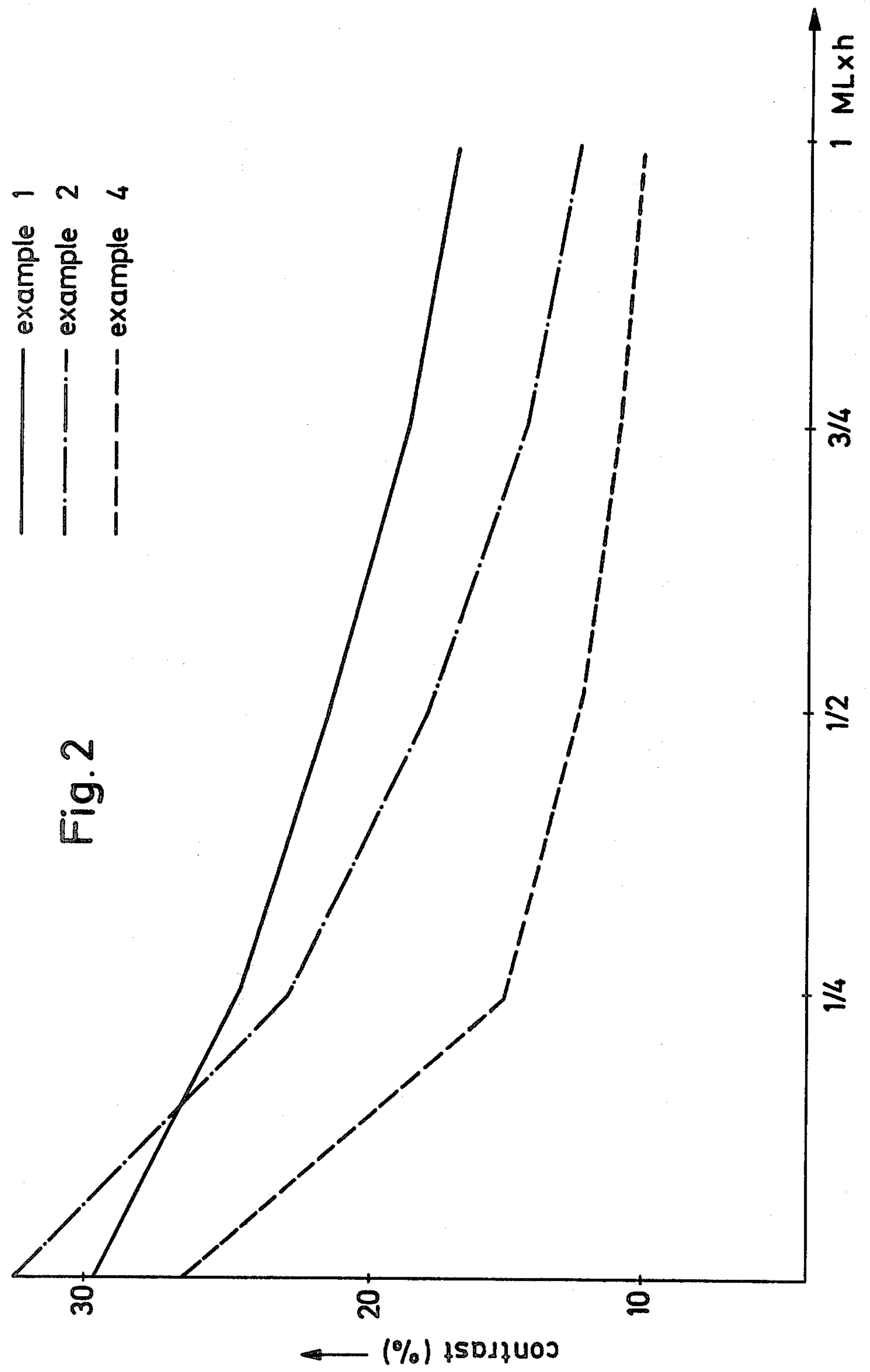
Figure 3:
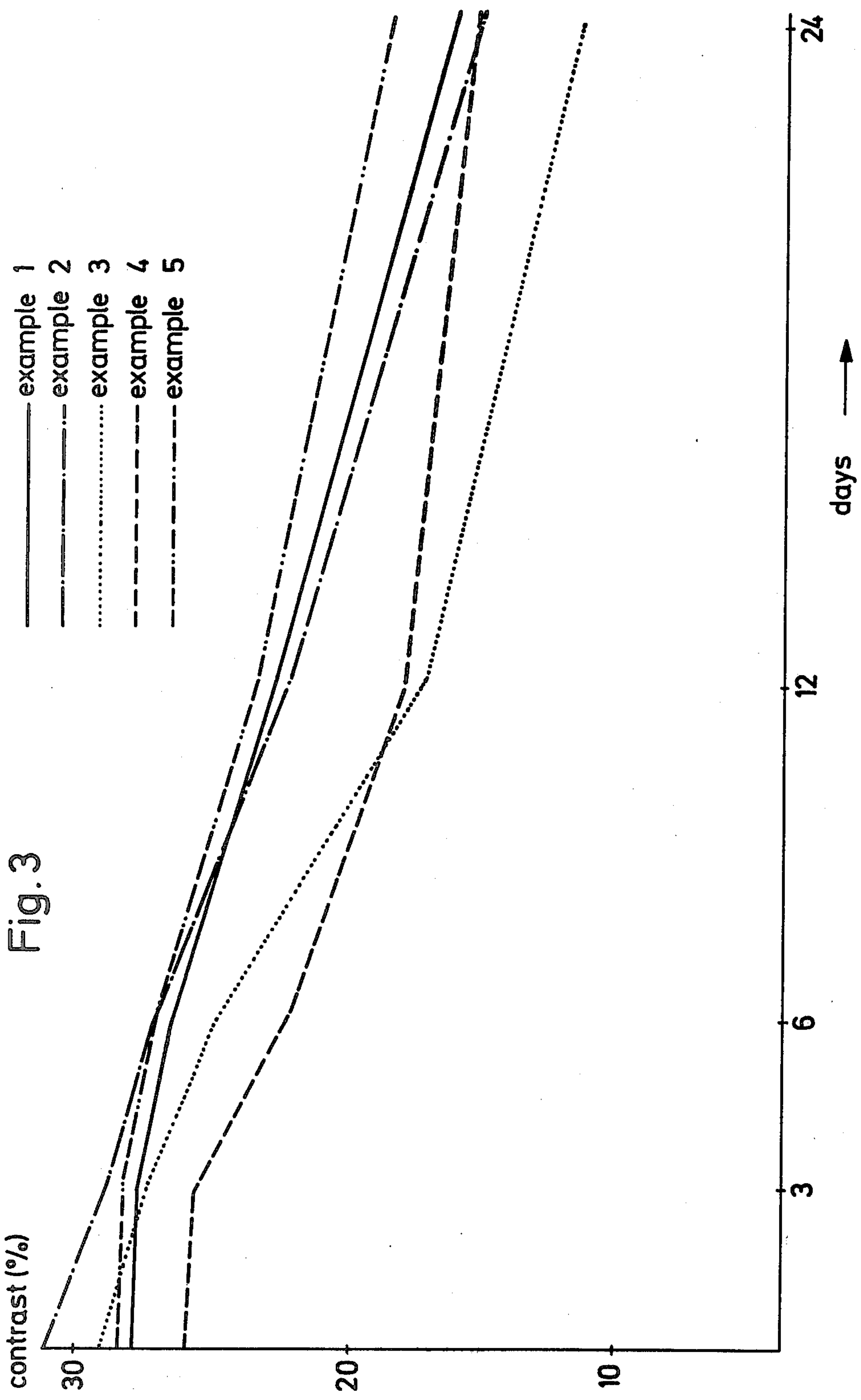
Figure 4:
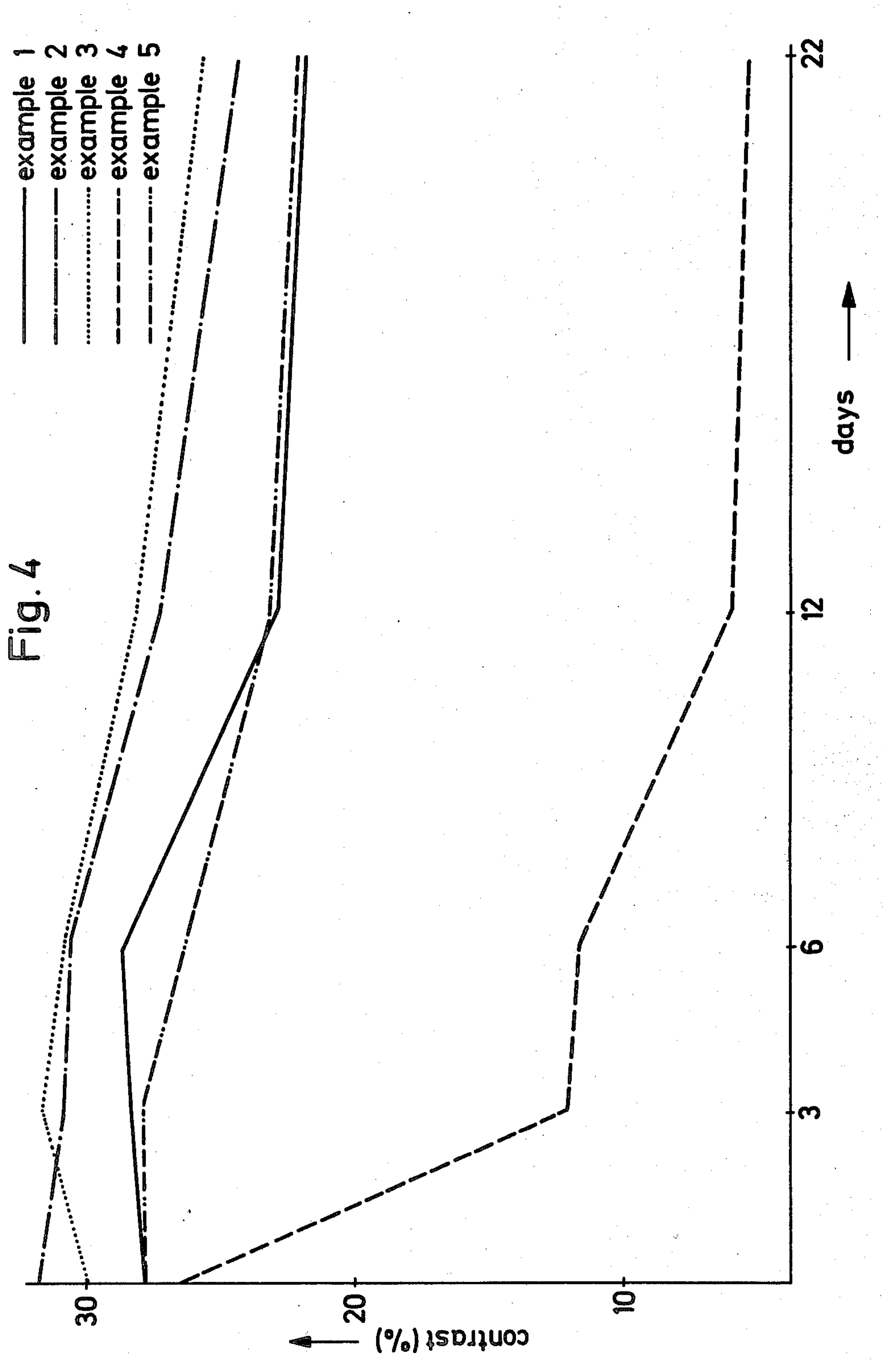

The invention will further be illustrated by the following Examples the results of which are illustrated in the attached drawing in which:

FIG. 1 graphically illustrates the effect of daylight exposure on color contrast developed on the papers of Examples 1 to 4;

FIG. 2 similarly illustrates the effect of artificial light on color contrast developed on the papers of Examples 1, 2, and 4;

FIG. 3 shows the effect of storage at high temperature and humidity on color contrast developed on papers of Examples 1 to 5; and FIG. 4 is a diagram illustrating the ability of the papers of Examples 1 to 5 to develop color after storage at high temperature and high humidity.

EXAMPLE 1

A coating composition was prepared from the following ingredients, all parts being by weight:

| | |
|---|---|
| Water | 300 parts |
| Dispersing agent A (sodium salt of a polyacrylic acid) | 2.0 parts |
| 40% Dispersing agent B (sodium salt of a polyelectrolyte) | 0.32 parts |
| Iron-containing, acid digested montmorillonite | 100 parts |
| 98% Zinc chloride (tech. grade) | 16.47 parts |
| 30% Sodium hydroxide | 26.33 parts |
| 25% Ammonium chloride | 8 units |
| 50% Styrene-butadiene copolymer latex | 52.5 units |

The montmorillonite was uniformly dispersed in the the presence of about one quarter of the total amount of each dispersing agent. The zinc chloride thereafter was mixed with the slurry so produced, and the sodium hydroxide solution was added dropwise with strong agitation to precipitate basic zinc chloride. The resulting increase in viscosity was reversed by the addition of the ammonium chloride (about ¼ mole per mole of zinc chloride) together with the remainder of the polycarboxylic acid salt. Viscosity increased again upon admixture of the butadiene-styrene copolymer latex, and was reduced to the ultimate value by adding the remainder of the polyelectrolyte salt.

The percentage of zinc, calculated as ZnO, in the total amount of reactive pigments was 9.6%. The amount of NaOH added was 83.4% of that needed to convert all chloride to the hydroxide or oxide. The pH of the mixture was 6.6 both immediately after precipitation of the sparingly soluble or insoluble zinc salt and after all ingredients had been combined, and the viscosity of the finished coating composition, as determined by means of a Brookfield viscosimeter at 100 RPM, was 80 cp.

The composition was applied to one face of coating paper free from wood fibers which weighed 41 g/m$^2$ and carried a starch surface finish on both faces, by means of an airknife coating machine in an amount of 6.0 to 6.5 g/m$^2$, dried, and conditioned. A commercial donor paper coated with microcapsules containing crystal violet lactone and N-benzoyl leucomethylene blue was superimposed on the acceptor sheet so prepared, and rows of lower-case letters x were imprinted on that acceptor sheet from the donor sheet on an electric typewriter at constant pressure.

The contrast C produced by typing was calculated from the formula $$C(\%) = \frac{(W_o - W_p) \times 100}{W_o}$$

wherein $W_o$ is the reflectivity of the blank acceptor paper for white light, and $W_p$ is the reflectivity of the paper after imprinting. Contrast was determined from time to time on samples of the acceptor paper exposed to daylight, on samples exposed to the light of a xenon lamp, and on paper that was being aged at 70° C. and 75% R.H. Furthermore, blank acceptor paper was aged at 70° C. and 70% R.H., thereafter imprinted and contrast was measured to establish aging properties of the stored paper.

The results of the four tests are represented in FIGS. 1 to 4 by fully drawn lines. The paper prepared by the procedure outlined above compared favorably with other acceptor papers, presently to be described by the stability of the developed color over 21 days of exposure to daylight and to one megalux hour of artifical light, as is shown in FIGS. 1 and 2. This good light-fastness is characteristic of the montmorillonite in the presence of the zinc salt. The ability of the paper to develop color after aging was relatively poor as is evident from FIG. 4.

In the following Examples, coating compositions were prepared, applied to paper, and the acceptor sheets produced were tested under conditions identical with those of Example 1 as far as not explicity stated otherwise.

EXAMPLE 2

The procedure outlined above was repeated but one half of the montmorillonite was replaced by a mixture of γ-alumina and precursors thereof containing 10% water volatile at 1000° C. The ratio of ZnO to other pigments, the ratio of sodium hydroxide to zinc salt, and the pH of the coating composition were substantially the same as in Example 1. The viscosity of the coating composition was only 60 cp because the entire amount of polyelectrolyte was added to the otherwise finished coating composition which was applied to the same grade of paper as in Example 1 under closely controlled identical conditions. The acceptor paper so prepared was tested as described in Example 1, and the test results are indicated graphically in FIGS. 1 to 4 by a chain-dotted lines.

Replacement of some montmorillonite by γ-alumina and its precursors slightly impaired long-range light fastness as compared to the acceptor paper of Example 1, but substantially improved the ability of the paper to develop color after aging.

EXAMPLE 3

The procedure of Example 1 was following in preparing a coating composition from the following components:

| | |
|---|---|
| Water | 289 parts |
| Dispersing agent A | 2.0 parts |
| γ-alumina and precursors (10% volatile water) | 70 parts |
| Iron-containing, acid digested montmorillonite | 30 parts |
| 98% Zinc chloride (tech. grade) | 11.53 parts |
| 30% Sodium hydroxide | 18.43 parts |
| 25% Ammonium chloride | 5.6 parts |
| 50% Styrene-buradiene copolymer latex | 52.5 parts |
| 40% Dispersing agent B | 0.32 parts |

Zinc, as ZnO, amounted to 6.75% of all active pigments, and the NaOH employed was 83.4% of that required to precipitate all zinc as oxide or hydroxide. The pH after zinc precipitation and in the finished composition was 6.7, and the viscosity of the composition 78 cp.

The composition was coated on the same paper in the same manner as in the preceeding Examples, and the acceptor paper so produced was tested for fastness to daylight, aging of the developed color, and ability of aged blank paper to develop color. The results are indicated in FIGS. 2, 3, and 4, by dotted lines. The resistance of the developed color to light and to aging at high temperature and humidity was impaired as compared to the paper of Example 1 which contained more montmorillonite, but the ability of the blank paper to develop color after aging was outstanding.

EXAMPLE 4

For comparison purpose, a conventional acceptor paper was prepared in the manner of Example 1 with a composition containing iron-bearing, acid digested montmorillonite as the only active pigment, but free from basic zinc chloride. For better reactivity of the clay with the leuko-dyes of the donor sheet, the composition was adjusted to pH 9.8 with sodium sillicate solution prior to application to paper. The paper, when tested for resistance of the developed color to daylight, artificial light, and aging was inferior under most conditions to the zinc bearing papers described with reference to FIG. 3. It was particularly unsuited for developing color after the blank paper had been aged at high temperature and high humidity, as is evident from the broken lines representing performance of this paper in FIGS. 1 to 4.

EXAMPLE 5

In the otherwise unchanged procedure of Example 3, the γ-alumina and its precursors were replaced by additional montmorillonite, making the total amount of the iron-bearing, acid digested clay 100 parts. The pH of the mixture after precipitation of the zinc was 6.6, the ultimate pH of the coating composition 6.7, and the viscosity of the composition 75 cp.

The test results of the coated acceptor paper are represented in FIGS. 3 and 4 alternating triple dashes and double dots. They show an aging resistance both for the developed color and the blank acceptor paper which is at least equal, and perhaps slightly superior to that of the paper prepared in Example 1. The lightfastness values of the paper coated according to Example 5 are not shown in the drawing. They were found to be indentical, within the margin of testing error, with those obtained for the paper of FIG. 1.

EXAMPLE 6

A coating composition was prepared from the following ingredients:

| | |
|---|---|
| Water | 291 parts |
| Dispersing agent A | 2.0 parts |
| γ-alumina and precursors (10% water) | 70 parts |
| 20% $CuSO_4 \cdot 5H_2O$ | 10.2 parts |
| Iron-bearing, acid digested montmorillonite | 30 parts |
| 30% Sodium hydroxide | 19.48 parts |
| 98% Zinc chloride, tech. grade | 11.53 parts |
| 25% Ammonium chloride | 8 parts |
| 50% Styrene-butadiene copolymer latex | 52.5 parts |
| 40% Dispersing agent B | 0.32 parts |

The procedure of Example 1 was modified in that copper sulfate was added to a slurry of the alumina and was adsorbed thereby from the solution. Thereafter, 2.18 parts NaOH was added to convert the adsorbed copper ions to practically insoluble basic copper compounds on the pigment surfaces. The montmorillonite and zinc chloride were admixed next, and insoluble zinc compounds were precipitated in the manner described above, whereupon the ph of the mixture was 6.8. When the coating composition was finished, its pigments contained 6.75% zinc (as ZnO). The amount of sodium hydroxide employed amounted to 80% of that required for precipitating all diavalent ions as the hydroxides or oxides. The copper content, based on CuO and $Al_2O_3$, was 0.93%.

EXAMPLE 7

Yet, another acceptor paper was prepared from the same paper as in the preceding Examples by coating with the same weight of a coating composition as described before. The composition of this Example was prepared from the following ingredients:

| | |
|---|---|
| Water | 291 parts |
| Dispersing agent A | 2.0 parts |
| 40% Dispersing agent B | 0.4 parts |
| Non-ionic anti-foaming agent | 0.7 parts |
| γ-Alumina and precursors (10% water) | 70 parts |
| 20% $CuSO_4 \cdot 5H_2O$ | 10.02 parts |
| 30% Rosin soap (0.207 g NaOH/g anhydrous rosin) | 25.44 parts |
| Iron-bearing, acid digested montmorillonite | 30 parts |
| 98% Zinc chloride (tech. grade) | 11.53 parts |
| 30% Sodium hydroxide | 18.43 parts |
| 25% Ammonium chloride | 5.6 parts |
| 50% Styrene-butadiene copolymer latex | 52.5 parts |

The zinc (as ZnO) amounted to 6.75% of the weight of all pigments present. The amount of sodium hydroxide employed was 80% of that needed for precipitating all divalent metal ions present as hydroxides or oxides. 60% of the zinc in the composition was present as $ZnCl_2[Zn(OH)_2]_4$. The mixture had a pH of 6.8 both after precipitation of the zinc compounds and after completion of the coating compositon which had a viscosity of 100 cp. Copper, calculated as CuO, amounted to 0.93% of the alumina present, and was dispersed on the surface of the alumina particles in the manner described in Example 6.

Dispersing agent B (sodium salt of a polyelectrolyte) is a commercial product containing as principal active ingredient a sodium polyacrylate of a molecular weight different from that of dispersing agent A.

However, neither dispersing agent is essential to the success of this invention, and numerous other dispersing agents are available for dispersing clays and other insoluble inorganic compounds in the water employed for making a coating composition. The organic binder employed in the coating solution may be chosen freely among many commercial products on the market. However, latex binders have been recognized as offering advantages not possessed by other binders at this time, and it is one of the important advantages of this invention that it permits the incorporation of zinc in coating compositions without coagulating or otherwise affecting the latex binder.

What is claimed is:

1. In a paper coating composition consisting essentially of water, a polymeric organic binder, and inorganic dispersed compounds capable of developing color by contact with at least one member of the group consisting of crystal violet lactone, malachite green lactone, N-benzoylleukomethylene blue, and N-phenylleukauramine after said coating is deposited on a substrate and said water is removed by drying, the improvement which comprises:

(a) said compounds including an amount of basic zinc salt substantially insoluble in said water and containing more than 50% $ZnCl_2(Zn(OH)_2)_4$, said amount as ZnO, being 2 to 50 percent by weight of said compounds on a dry basis; and (b) the pH of said composition being below 7.

2. In a composition as set forth in claim 1, said inorganic compounds consisting predominantly of montmorillonite and a mixture of γ-alumina and precursors of said γ-alumina, said mixture losing 1% to 30% water by volatilization and being converted substantially entirely to γ-alumina when heated from 300° C. to 1000° C., the weight ratio of said montmorillonite and said mixture being between 90:10 and 10:90.

3. In a composition as set forth in claim 2, said amount, as ZnO, being 5 to 10 percent by weight of said compounds on a dry basis.

4. In a composition as set forth in claim 3, said compounds including cupric salt in an amount of 0.1% to 10% of the weight of said mixture.

5. In a composition as set forth in claim 3, said binder being a latex, and said pH being between 6 and 7.

6. In a composition as set forth in claim 5, said material being a synthetic rubber.

7. In a composition as set forth in claim 6, an amount of ammonium chloride dissolved in said water sufficient to reduce the viscosity of said composition to less than 110 cp as determined by means of a Brookfield viscosimeter at 100 RPM.

8. In a composition as set forth in claim 1, said dispersed compounds consisting, on a dry basis, of (a) 30–50% of a mixture of γ-alumina and precursors of said γ-alumina, said mixture losing 1% to 30% water by volatilization and being converted substantially entirely to γ-alumina when heated from 300° to 1000°C.: p1 (b) 70–50% of a clay capable of developing color by contact with said at least one member;

(c) 2–12% of said basic zinc salt, calculated as ZnO; and (d) 0.1–2% basic copper salt, calculated as CuO.

9. A method of preparing a coating composition as set forth in claim 1 which comprises:

(a) dispersing those of said dispersed compounds which are free from zinc in an aqueous solution of a zinc salt;

(b) adding to the slurry so produced an amount of an alkalinizing agent sufficient to convert said zinc salt to a basic zinc salt practically insoluble in water, but insufficient to convert said zinc salt to the oxide or hydroxide of zinc; and (c) mixing the resulting product at a pH lower than 7 with a latex of an elastomer in an amount sufficient to bind said dispersed compounds and said basic zinc salt to a substrate when said product is coated on said substrate and dried.

* * * * *